(12) United States Patent
Oehmann

(10) Patent No.: US 7,677,775 B2
(45) Date of Patent: Mar. 16, 2010

(54) EXTERIOR REAR-VIEW MIRROR FOR VEHICLES, ESPECIALLY FOR MOTOR VEHICLES

(75) Inventor: Roland Oehmann, Stuttgart (DE)

(73) Assignee: SMR Patents S.a.r.l., Luxembourg (LU)

( * ) Notice: Subject to any disclaimer, the term of this patent is extended or adjusted under 35 U.S.C. 154(b) by 391 days.

(21) Appl. No.: 11/597,030

(22) PCT Filed: May 13, 2005

(86) PCT No.: PCT/EP2005/005217

§ 371 (c)(1),
(2), (4) Date: Jul. 2, 2007

(87) PCT Pub. No.: WO2005/113291

PCT Pub. Date: Dec. 1, 2005

(65) Prior Publication Data

US 2007/0242469 A1    Oct. 18, 2007

(30) Foreign Application Priority Data

May 17, 2004   (DE) .................... 10 2004 025 369

(51) Int. Cl.
*B60Q 1/26* (2006.01)
(52) U.S. Cl. .................. 362/494; 362/135; 362/396; 362/492; 362/540; 359/844; 340/475; 340/479
(58) Field of Classification Search ............... 340/475, 340/479; 359/844, 864; 362/135, 140, 396, 362/492, 494, 540
See application file for complete search history.

(56) References Cited

U.S. PATENT DOCUMENTS

| | | | |
|---|---|---|---|
| 6,511,192 B1* | 1/2003 | Henion et al. | 359/864 |
| 6,556,350 B2 | 4/2003 | Nakaho et al. | |
| 7,510,311 B2* | 3/2009 | Romas et al. | 362/494 |
| 2003/0179087 A1* | 9/2003 | Stahel | 340/475 |

* cited by examiner

Primary Examiner—Stephen F Husar
(74) Attorney, Agent, or Firm—Reising Ethington P.C.

(57) ABSTRACT

An external rearview mirror assembly is designed for a motor vehicle. The external rearview mirror assembly includes a mirror housing. A mirror glass carrier is operatively connected to the mirror housing. A piece of mirror glass is fixedly secured to the mirror glass carrier and is movable with respect to the mirror housing. The mirror glass defines a peripheral edge. An attaching part is fixedly secured to the mirror glass carrier wherein the attachment part extends about a portion of the peripheral edge.

17 Claims, 4 Drawing Sheets

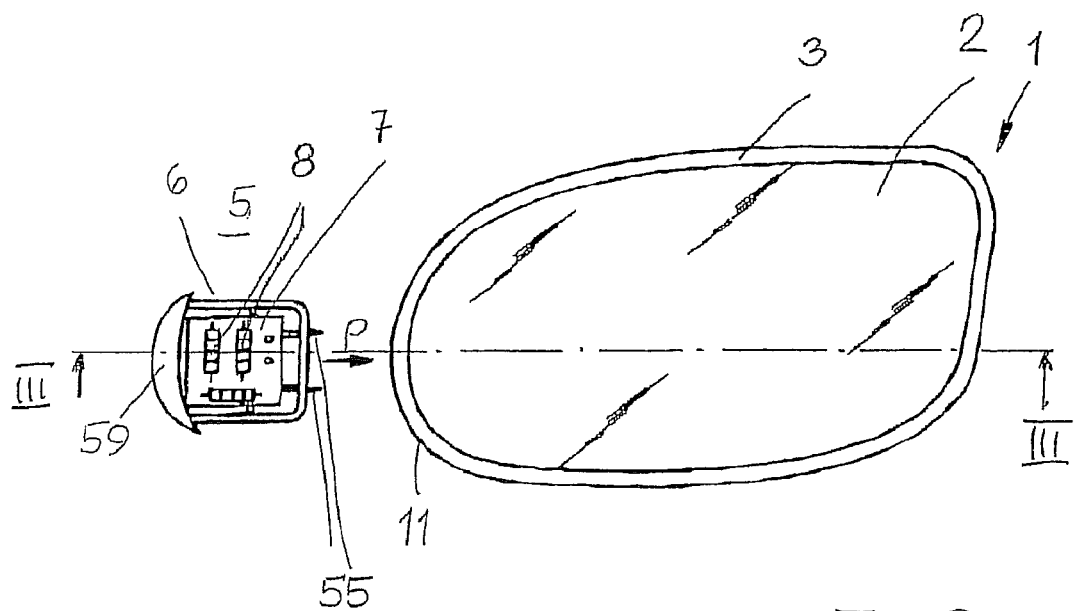
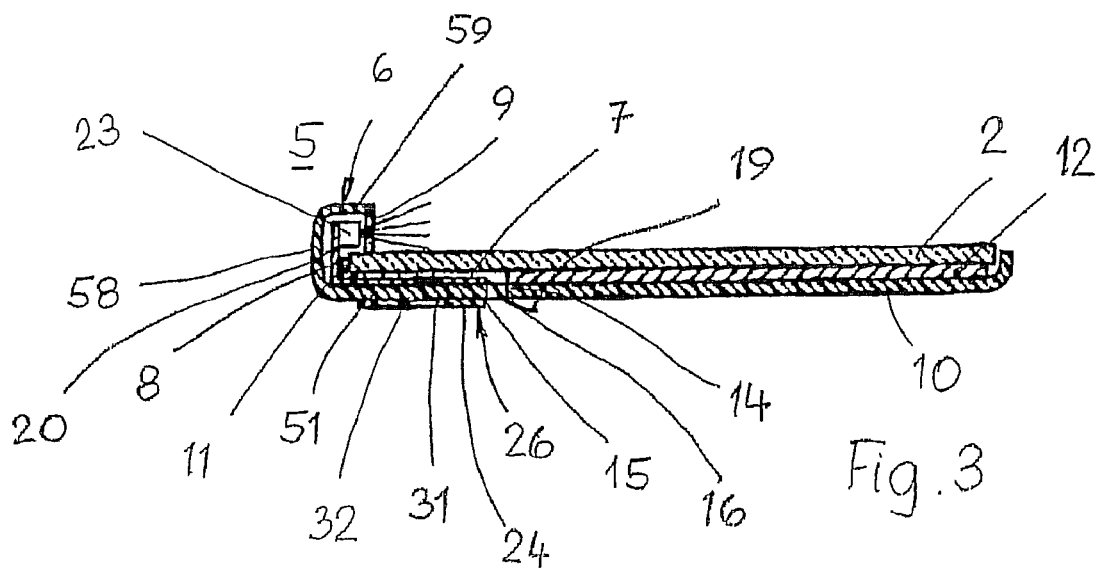

EXTERIOR REAR-VIEW MIRROR FOR VEHICLES, ESPECIALLY FOR MOTOR VEHICLES

BACKGROUND ART

1. Field of the Invention

The invention relates to an exterior rear view mirror for vehicles. More particularly, the invention relates to an exterior rear view mirror with an attachment secured thereto.

2. Description of the Related Art

It is a known practice to provide signal, peripheral, or indicator lights on the exterior rear view mirror. They are either provided in the mirror housing or in the mirror foot. Many of these systems are completely integrated into the mirror housing. This design incorporation allows for a sleeker profile and good moisture sealing qualities. This type of combination does, however, render it difficult to change out light units that fail prematurely. Sonic welds and bonding materials need to be severed to access the light unit in order to service it.

SUMMARY OF THE INVENTION

An external rearview mirror assembly is designed for a motor vehicle. The external rearview mirror assembly includes a mirror housing. A mirror glass carrier is operatively connected to the mirror housing. A piece of mirror glass is fixedly secured to the mirror glass carrier and is movable with respect to the mirror housing. The mirror glass defines a peripheral edge. An attaching part is fixedly secured to the mirror glass carrier wherein the attachment part extends about a portion of the peripheral edge.

BRIEF DESCRIPTION OF THE DRAWINGS

Advantages of the invention will be readily appreciated as the same becomes better understood by reference to the following detailed description when considered in connection with the accompanying drawings, wherein:

FIG. 2 is an exploded side view of a second embodiment of the invention;

FIG. 3 is a cross-sectional side view taken along the line III-III in FIG. 2 with the attaching part mounted;

DETAILED DESCRIPTION OF THE PREFERRED EMBODIMENTS

Figure 1:
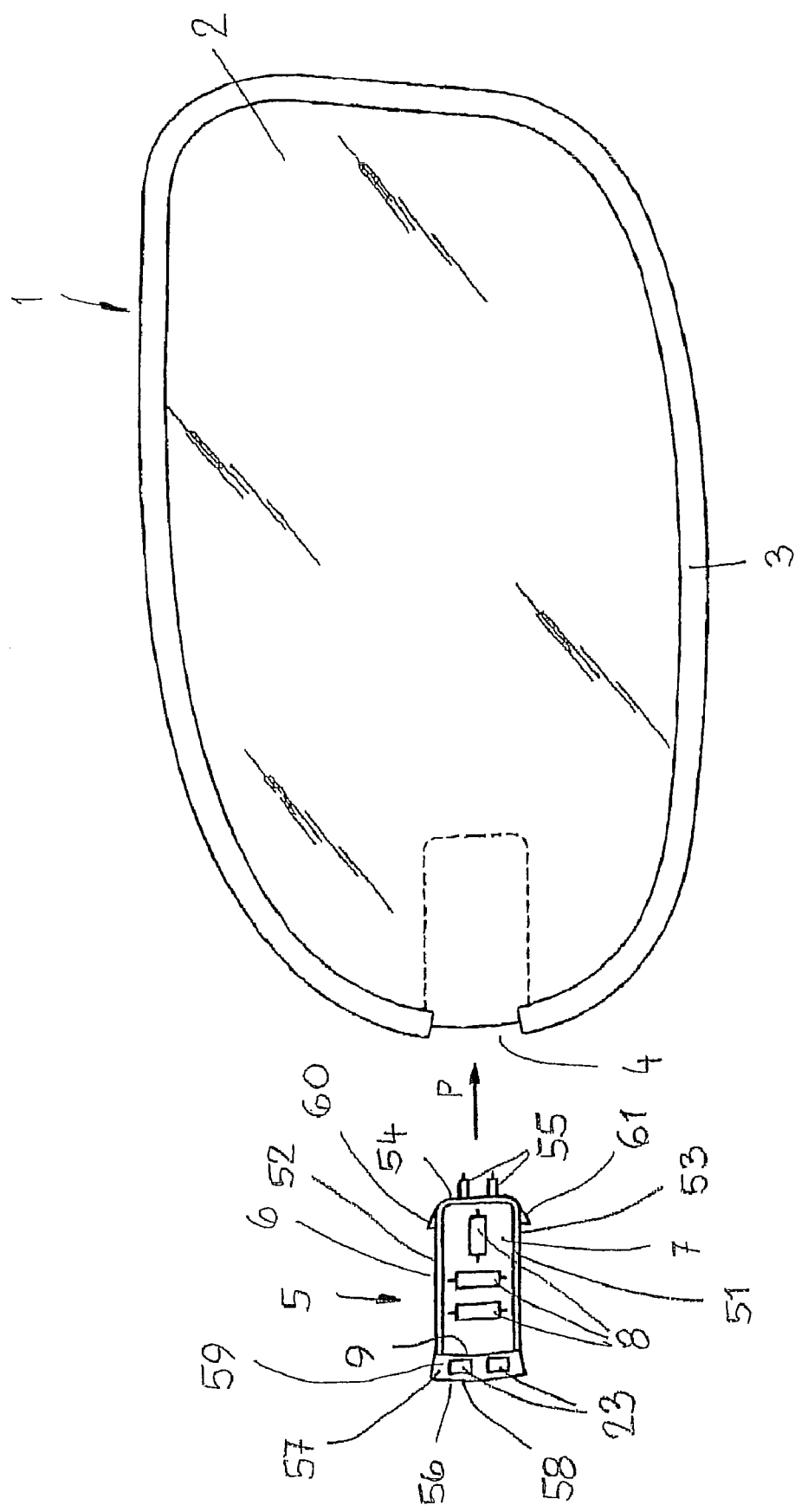
FIG. 1 is an exploded side view of one embodiment of the invention.

The exterior rear view mirror 1, represented in simplified form in FIG. 1, is provided for motor vehicles. It includes in a known manner a housing (not represented) in which a mirror glass carrier (also not represented) is disposed which carries a mirror glass 2 formed as EC or normal glass. The exterior rear view mirror 1 also includes an encircling mirror glass frame 3. It is, however, also possible to form the mirror glass without a frame (FIG. 3). As is represented in FIG. 1, the mirror glass frame 3 includes in a relatively narrow edge area.

The mirror glass frame 3 defines an insertion opening 4 for a push-in module, or attaching part, 5 which can be pushed into the recess in the direction of the arrow P and engagable with a catch formed therein. The attaching part 5 can be a modular indicator, signal, or peripheral light. It includes a housing 6 in which a circuit board 7 with electrical/electronic components 8 and one or more light sources 23 is disposed. The light sources 23 are preferably formed by LEDs. They can also be incandescent lamps or the like which are disposed on the circuit board. The circuit board 7 can, in a known manner, be formed to be rigid or as a flexible foil. As is still to be described in the following, the light emitted by the light source 23 exits via at least one light exit surface of the module housing 6 above the mirror glass 2. The light exit surface being formed as a light plate 9, so that the light emitted from the attaching part 5, which has the function of a display, can be seen clearly by the driver of the motor vehicle. If the attaching part 5 has no display function, e.g., serves as a blinking light or as a peripheral light, it is not necessary that the driver sees the light emitted by the attaching part 5.

Since the light source 23 is integrated into the mirror glass frame 3, it needs only a little mounting space. And, along with the attaching part 5, if the light source 23 and/or the attaching part 5 is damaged or if, for example, it is supposed to be replaced by another attaching part of a desired color, the attaching part 5 can be taken out of the insertion opening 4 simply and quickly at any time, and then another component can be pushed in the direction of the plug-in arrow P into the insertion opening 4, until it is disposed in a form-locking manner on the frame 3.

In this position, the circuit board 7 lies with the components 8 below the mirror glass 2 (cf. the dashed lines in FIG. 1) and is engaged so as to catch there, as is still to be described with the aid of the additional forms of embodiment. If a LED is used as the light source, it can be formed so that it also forms a light plate. In this instance, the light plate as a separate structure could be omitted.

The housing 6 has a flat base 51 on which the circuit board 7 lies. The base 51 is formed so as to be approximately rectangular. The two longitudinal edges 52, 53 of the base 51 extend in the longitudinal plug-in direction P. Contacts 55 extend over the front, in the plug-in direction P, edge 54 of the base 51. Upon insertion of the push-in part 5, the contacts 55 engage counter contacts (not represented).

On the opposite edge 56, an edge section 57 stands out from the base 51, the edge section of which being shaped and formed so that it forms, in the mounted position of the push-in module 5, a continuous continuation of the mirror glass frame 3 in the area of the push-in opening 4. More specifically, the edge section has the same contour as the mirror glass frame 3.

The edge section 57 has a side wall 58 which connects approximately perpendicularly to the base 51 and at a distance from the base 51 turns into a roof-like upper part 59 under which the light sources 23 are located. The upper part 59 can terminate a light plate (not represented) which reaches, in the mounted position of the push-in module 5, up to the mirror glass 2 and through which the light emitted by the light sources 23 exits to the outside.

The base 51 comprises near to the edge 54 on each of its two longitudinal edges 52, 53 a catch 60, 61 with which the push-in module 5, in the mounted position, engages so as to catch in counter catch elements of the mirror glass carrier.

If no display function is required, or this is not desired, merely a blind part can also be used instead of the attaching part 5. The blind part includes no circuit board and no light source. This blind part has essentially the same form as the attaching part 5 so that, for a form-locking complementation of the mirror glass frame 3, it can be pushed into the insertion opening 4 and engaged so as to catch there. The blind part, which needs no LED, is advantageously lower than the attaching part 5 so that it has the same height as the mirror glass frame 3. If necessary, the blind part can be replaced at any time with an attaching module 5 with electrical/electronic components 8 and/or light sources 23 so that the exterior rear view mirror 1 can be used, depending on the attaching part used, for the most varied functions. The components 8 and the light sources 23 are disposed on the circuit board 7 in a known manner and connected to it.

The form of embodiment according to FIGS. 2 and 3 is distinguished from the previously described embodiment essentially by the fact that the attaching part 5 is not plugged into an insertion opening of the mirror glass frame 3. Rather, the attachment part 5 is plugged onto an edge 11 of the mirror glass carrier plate 10. It is bent approximately perpendicularly (FIG. 3) and encircles the mirror glass 2 held on the carrier plate 10. In this form of embodiment, an EC glass can be used. The EC glass may be glued on the edge side to the carrier plate 11, whereby the is prevented from running out of the exterior rear view mirror 1 during manufacture. Obviously, a normal, economical glass can be used instead of the EC glass.

The attaching part 5 is plugged or clipped on the edge 11 of the mirror glass carrier plate 10. The mirror glass 2 is formed without an edge as a plane plate and advantageously lies, with the interposition of a heating foil 12, on the mirror glass carrier plate 10. At the connecting point for the attaching part 5, the mirror glass carrier plate 10 includes a mounting bracket 26 projecting downwardly over the plane of its plate. The mounting bracket includes, for the catch element, a receiving space 31 into which, in the mounted position of the attaching part 5, at least one catch element 32 of the housing 6 projects. The catch element 32 is provided on the base 51 of the housing 6. The base in the mounted position is approximately flush with the mirror glass carrier plate 10. On the base 51, the circuit board 7 is disposed with electrical/electronic components 8 and the light sources 23.

The circuit board 7 is provided at its edge facing towards the side wall 58 of the housing 6 with an upwardly directed leg 20 which extends approximately parallel to the side wall 58 and ends at a distance from the upper part 59 of the housing 6. Between the free end of the upper part 59 of the housing and the mirror glass 2 the light plate 9 extends over the width of the push-in module 5, behind which the light sources 23 are located. The light plate 9 can be omitted if the light sources 23 are formed as a correspondingly shaped LED, which then serves as a light plate. The light sources 23 sit on the leg 20 of the circuit board on the side facing towards the light plate 9. According to the previous form of embodiment, the light sources 23 are advantageously formed by at least one LED which emits its light in the area above the mirror glass carrier 2 through the light plate 9.

Between the front, in the plug-in direction P, edge 15 of the mounting bracket 26 and a neighboring edge 14 of the mirror glass carrier plate 10, a gap 16 is formed through which at least one line 19 projects. The line 19 provides the current/voltage supply to the components seated on the circuit board 7. It is, however, also possible in the exterior rear view mirror 1 to provide a plug-on connector strip (not represented) into which the plug-in contacts 55 of the circuit board 7 engage. In this way the current/voltage supply for the components 8 and the light sources 23 of the push-in module 5 is produced automatically in the plug-in process, as in the previous form of embodiment.

The push-in module 5 is reliably held in the mounted position as a consequence of the catch connection described.

The light plate 9 advantageously lies with its edge on the mirror glass 2 so that protection against the penetration of dirt, moisture, and the like into the push-in module 5 is, at least substantially, prevented.

The upper part 59 of the housing is formed in plan view in the form of a sickle (FIG. 2) and thus approximately adapted to the form of the edge 11 of the mirror glass carrier plate 10. The sickle form has the advantage that the light emitted by the light sources 23 in the case of indicator functions of the attaching part 5 is deflected at least partially in the direction towards the driver side of the motor vehicle.

As in the previous embodiment example, the push-in module 5 is disposed at an edge area of the exterior rear view mirror 1, specifically the edge area lying furthest removed from the motor vehicle. In other words, the attaching part 5 is secured to the exterior rear view mirror 1 at its outboard surface. Therefore, the light emitted from the light sources 23 can be seen clearly by the driver of the motor vehicle.

In the mounted position, the mounting bracket 26 lies with its leg 24 flat on a side of the base 51, specifically that side facing away from the mirror glass carrier plate 10. The push-in module 5 is supported securely thereby.

If necessary, the catch connection can be released in a simple manner and the push-in module 5 can be withdrawn.

Figure 4:
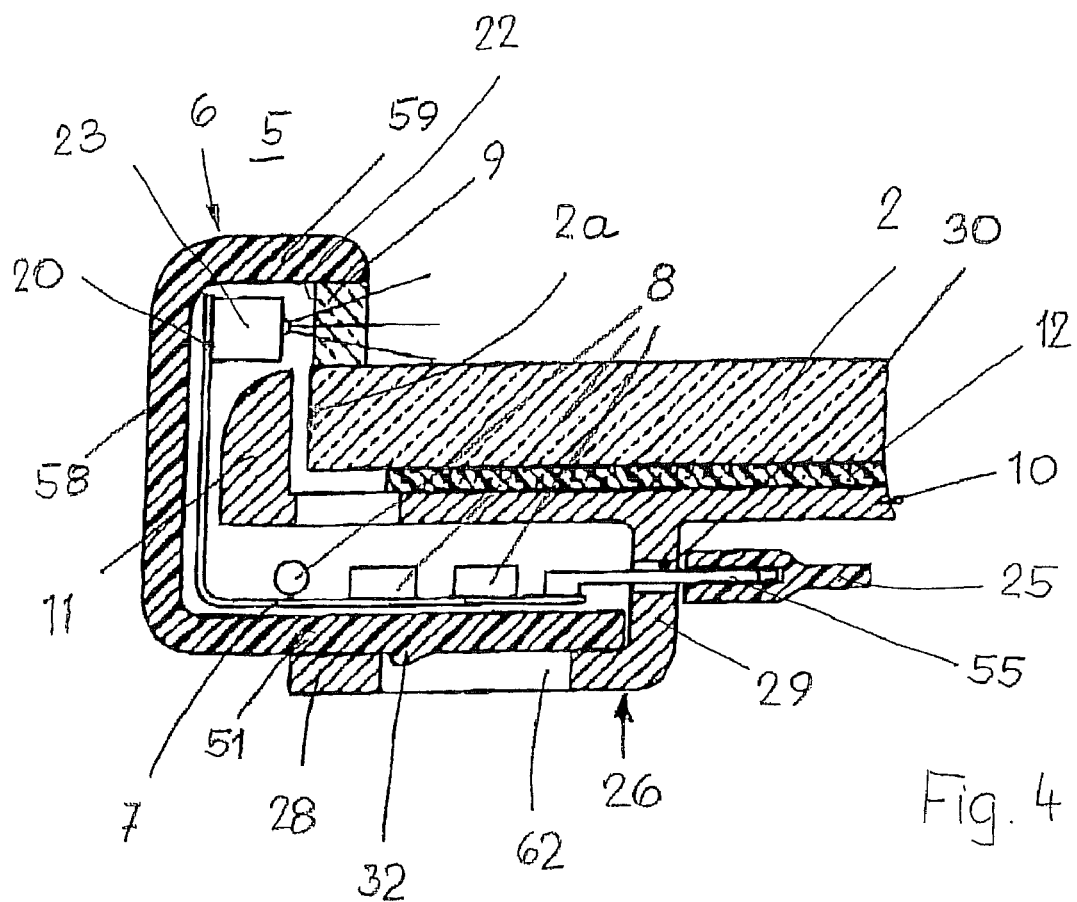
FIG. 4 is an enlarged representation a part of an additional form of embodiment of an exterior rear view mirror according to the invention in a section corresponding to FIG. 3.

In the embodiment example according to FIG. 4, the mirror glass 2 lies, with the interposition of the heating foil 12, on the mirror glass carrier plate 10. It has the edge 11 which is beveled in a rounded manner and encircles the mirror glass 2 at a slight distance from it. On the side facing away from the mirror glass 2, the mirror glass carrier plate 10 is provided on the edge side with the mounting bracket 26, which is formed according to the previous form of embodiment as one piece with the mirror glass carrier plate 10. In contradistinction to the previous embodiment example, the mounting bracket 26 is not formed to be U-shaped but rather to be L-shaped. Its short leg 29 connects to the mirror glass carrier plate 10 at a right angle. The longer leg 28 lies at a distance from the mirror glass carrier plate 10 and parallel to it. The leg 28 reaches approximately up to the level of the edge 11 of the mirror glass carrier plate 10.

The leg 28 of the mounting bracket 26 is provided with a catch opening 62 into which the catch element 32 of the push-in module 5 engages. It has the flat base 51 on whose side facing away from the mirror glass 2 the catch element 32 is provided. Corresponding to the previous embodiment examples, the catch element 32 is advantageously formed as one piece with the base 51.

The base 51 turns through the form of an arc into the side wall 58, which runs perpendicular to the base 51 and in the form of an arc into the upper part 59 of the housing. It extends at a distance from the mirror glass 2 beyond its edge. Between the free edge of the upper part 59 of the housing and the mirror glass 2, the light plate 9 extends over the width of the push-in module 5. Its inner side 22 facing toward the light sources 23 advantageously lies in a plane with the edge 2a of the mirror glass 2.

The edge 11 of the mirror glass carrier plate 10 extends up to the level of the outer side of the mirror glass and, as in the previous embodiment example, is projected over by the housing 6 of the push-in module 5. The light source 23 is located in the area between the edge 11 of the mirror glass carrier plate 10 and the upper part 59 of the housing. The light source 23 is advantageously formed by at least one LED. It sits on the circuit board leg 20, which has a slight spacing from the rear wall 58 of the housing and extends up to the upper part 59 of the housing. The circuit board 7 with the components 8 is fastened on the base 51. The components 8 lie at a sufficient distance from the mirror glass carrier plate 10.

On the circuit board 7, plug-in contacts 55 are provided which extend in the plug-in direction P of the push-in module 5 beyond the base 51. When pushing on the push-in module 5, the plug-in contacts 55 reach into push-through openings 30 in the leg 29 of the mounting bracket 26. During mounting, the push-in module 5 is guided with its base 51 on the leg 28 of the mounting bracket 26 so that the plug-in contacts 55 reach reliably into the push-through openings 30. Behind the leg 29, a plug-in connector jack 25 is located, in which the plug-in contacts 55 engage and which ensure the current/voltage supply of the components 8 and the light sources 23 of the circuit board 7.

The mounting bracket 26 can be formed so that it extends over the entire circumference of the mirror glass carrier plate 10, therefore the legs 29 are formed as a ring and the legs 28 as an annular disk. In such a case the push-in module 5 can be mounted at any point of the edge 11.

Figure 5:
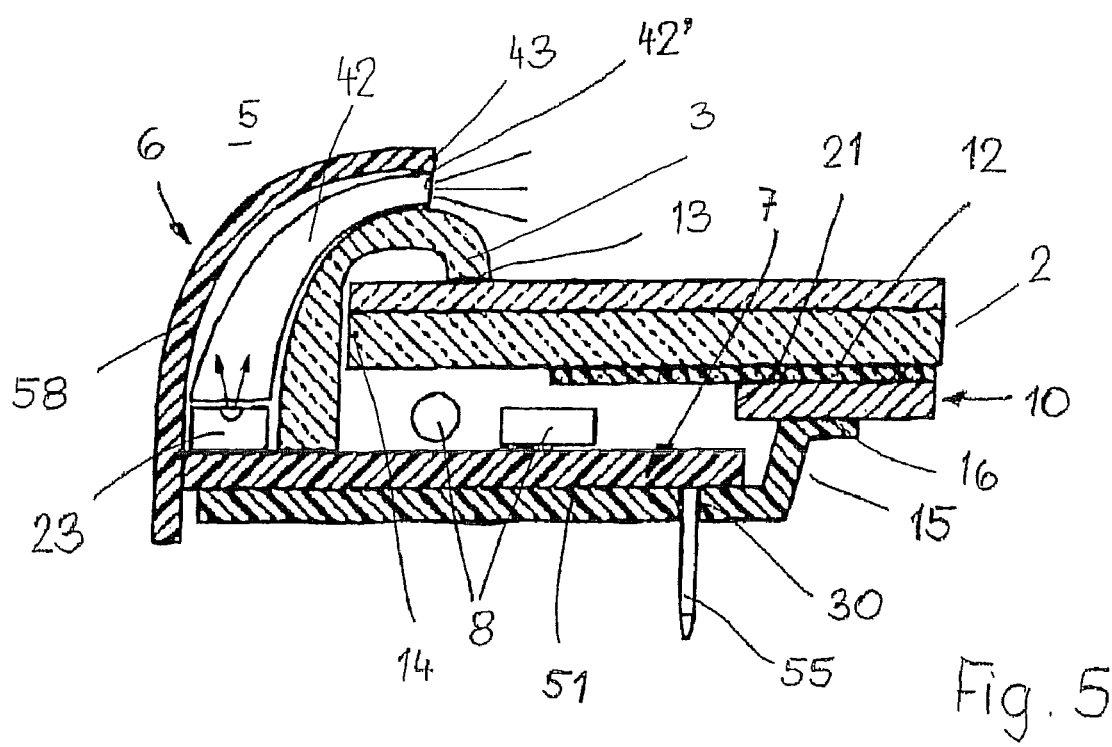
FIGS. 5 and 6 are cross-sectional side views of alternative embodiments of the invention.

In the form of embodiment according to FIG. 5 the attaching part 5 is fastened to the frame 3 of an EC mirror glass 2. The frame 3 has an approximately L-shaped cross section and lies with its free end 13 on the EC glass 2. As in the previous embodiment examples, it is, with the interposition of a heating foil 12, fastened to the mirror glass carrier plate 10. Its edge 21 is set back relative to the edge 14 of the mirror glass 2. The heating foil 12 projects over the mirror glass carrier plate 10 and extends up to near the edge 14 of the mirror glass 2.

To the underside of the mirror glass carrier plate 10, the base 51 of the module housing 6 is fastened in some manner, such as gluing, welding, or engaging with a catch. For this, the base 51 has an approximately z-shaped edge 15 slanted outwards, which with its free edge 16 lies flat on the mirror glass carrier plate 10. The push-through opening 30 for the plug-in contacts 55 is disposed near to the edge 15 the base 51. It carries the electronic components 8 and, in the area of the rear wall 58 of the housing 6, the light sources 23.

The circuit board 7 lies on the base 51 of the housing 6 and extends up to the housing's side wall 58, which runs in the form of a curve approximately in the area above the EC mirror glass 2 and extends up to beyond the edge 3 of the EC mirror glass 2. Between the housing's side wall 58 and the frame 3, at least one light conductor or wave guide 42 is disposed, which extends from the light sources 23 up to the free edge 43 of the housing's side wall 58. As stated above, a specially formed LED can be provided instead of the light conductor 42.

The light emitted from the light sources 23 enters the light conductor 42, which conducts the light up to the light exit surface 42'. It lies at the level of the free edge 43 of the housing's side wall 58 and in the area of the highest point of the mirror glass edge 3. The light shines, as in the previous embodiment examples, approximately parallel to the mirror glass's outer side in the direction towards the driver side of the motor vehicle.

The mirror glass edge 3 is not formed thinner at the point at which the attaching part 5 is supposed to be mounted. The attaching part 5 is formed so that to the light exit surface 42' lies above the frame 3. With this configuration, the attaching part 5 can be mounted in a simple manner at any desired point of the frame 3.

Figure 6:
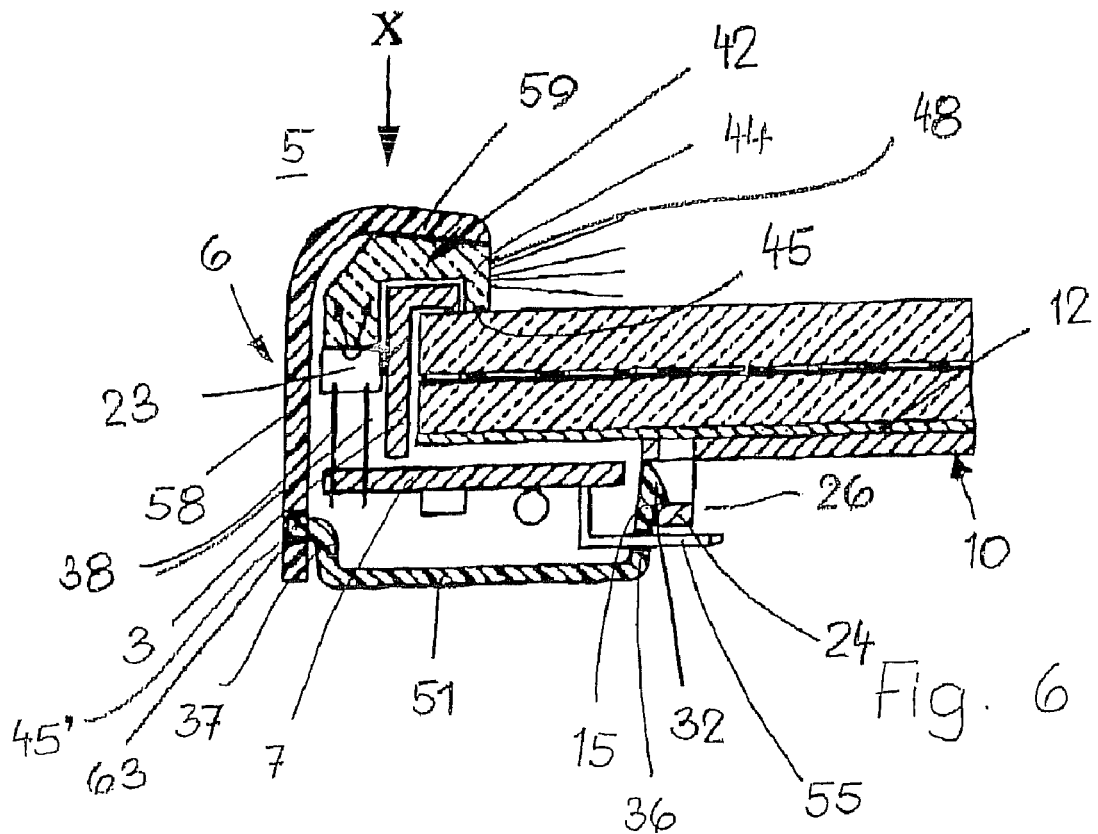
Figure 7:
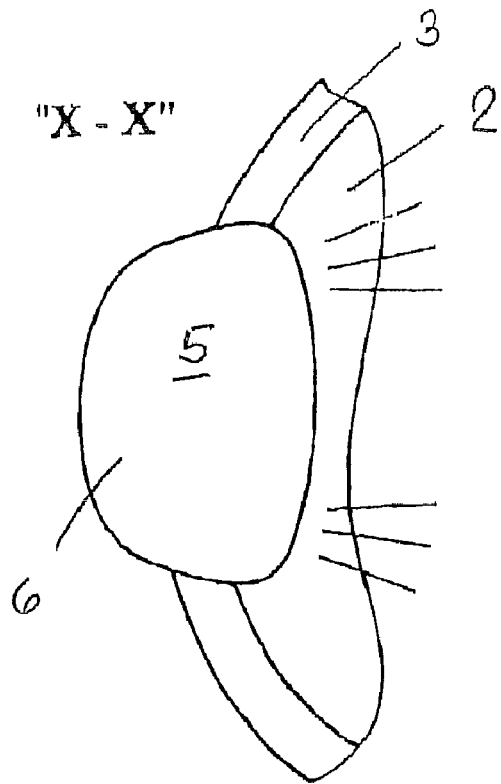
FIG. 7 is a view in the direction of the arrow X in FIG. 6.

In the embodiment example 1 according to FIGS. 6 and 7, the push-in module 5 is engaged in such a manner that it catches on the mirror glass carrier plate 10. It has the U-shaped mounting bracket 26, on whose leg 24 the push-in module 5 is engaged in such a manner that it catches with at least one hook-like catch element 32. It is formed as one piece with the base 51 of the module housing 6 and provided at the edge 15 of the housing base 51 and at a right angle in the direction of the mirror glass carrier plate 10.

The edge 15 is provided with at least one push-through opening 36 for the plug-in contacts 55 of the circuit board. The components 8 are provided on a side of the circuit board 7, specifically the side 7 facing away from the EC mirror glass 2, in contradistinction to the previous embodiment examples. The circuit board 7 extends through a plane and lies at a distance from the mirror glass carrier plate 10 and the base 51 of the housing 6.

The housing base 51 connects, via an edge 37 with a z-shaped cross section, to the housing's side wall 58. It has an opening 63 into which the edge 37 projects with its free end 45'. The side wall 58 turns into the upper part 59 of the housing, said upper part lying at a distance from the EC mirror glass 2. An edge 3 which is L-shaped in cross section engages over the upper part.

Near to an edge of the circuit board 7, specifically the edge neighboring the housing's side wall 58, the light source 23 is fastened with contact feet 38. The light source 23 is disposed in the area between the housing's side wall 58 and the frame 3 of the EC mirror glass 2. The light source 23 connects to the light conductor 42 which extends between the housing's side wall 58 and the housing's upper part 59 as well as the frame 3 of the EC mirror glass 2. At the level of the free end of the housing's upper part 59 the light conductor 42 is provided with an edge section 44 extending perpendicularly from the EC mirror glass 2. The edge section lying with its plane front side 45 directly abutting the frame 3 on the EC mirror glass 2. Through the plane light exit surface 48 of the edge section 44, the light exit surface lying perpendicular to the EC mirror glass 2, the light emitted by the light source 23 and conducted further in the light conductor 42 exits in the direction of the driver side of the motor vehicle.

The EC mirror glass 2 lies, with the interposition of the heating foil 12, on the carrier plate 10.

As FIG. 7 shows, two light sources are housed in the housing 6, where the light beams emitted by said lighting means and exiting from the light exit surface 45 can be seen.

The mirror head and/or the mirror foot of the exterior rear view mirror 1 can include additional elements, such as blinking lights, a camera, a GPS module, a washing unit for the mirror glass, a loudspeaker, an antenna, a part of the garage door opener, and the like. These elements can be provided in any combinations with one another in addition to the attaching part 5.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

The invention claimed is:

1. An external rearview mirror assembly for a motor vehicle, said external rearview mirror assembly comprising: a mirror housing; a mirror glass carrier operatively connected to said mirror housing, said mirror glass carrier defining an insertion opening adapted to receive a plurality of different inserts; a mirror glass fixedly secured to said mirror glass carrier and movable with respect to said mirror housing, said mirror glass defining a peripheral edge; wherein one of said plurality of different inserts is an attaching part matingly engagable with said insertion opening and removably securable to said mirror glass carrier, said attachment part extending about a portion of said peripheral edge and includes a light source.

2. An external rearview mirror assembly as set forth in claim 1 wherein said light source includes a light exit surface.

3. An external rearview mirror assembly as set forth in claim 2 wherein said light exit surface extends over said mirror glass interior of said peripheral edge to direct light from said light source back over said mirror glass toward the motor vehicle.

4. An external rearview mirror assembly as set forth in claim 3 wherein said attachment part includes electronics housed therein.

5. An external rearview mirror assembly as set forth in claim 4 wherein said electronics include a plurality of leads extending out of said attachment part.

6. An external rearview mirror assembly as set forth in claim 5 wherein said light source includes a light guide to direct light emitted by the light source around said peripheral edge and toward said mirror glass.

7. An external rearview mirror assembly as set forth in claim 6 wherein said attaching part includes catches for positively engaging said mirror glass carrier to prevent said attaching part from disengaging said mirror glass carrier.

8. An external rearview mirror assembly as set forth in claim 6 wherein said mirror glass carrier includes a mounting bracket.

9. An external rearview mirror assembly as set forth in claim 8 wherein said mounting bracket projects over said mirror glass carrier and is fastened to said attaching part.

10. An external rearview mirror assembly as set forth in claim 9 wherein said mounting bracket is L-shaped in cross-section.

11. An external rearview mirror assembly as set forth in claim 9 wherein said mounting bracket is U-shaped in cross-section.

12. An external rearview mirror assembly as set forth in claim 9 wherein said attaching part includes a base and a sidewall connected thereto.

13. An attaching part adapted to be secured to an external mirror assembly having a mirror glass defining a peripheral edge, said attaching part comprising: a base; a sidewall connected to said base and extending out therefrom; catches extending out from said sidewall to positively lock said attaching part to the external mirror assembly; a circuit board fixedly secured to said base; and a light source electronically connected to said circuit board for illuminating the mirror glass.

14. An attaching part as set forth in claim 13 wherein said base extends under the mirror glass.

15. An attaching part as set forth in claim 14 wherein said sidewall extends beyond the periphery of the mirror glass perpendicular to said base.

16. An attaching part as set forth in claim 15 including a light exit surface extending over the mirror glass interior of the mirror glass.

17. An attaching part as set forth in claim 16 wherein said base includes a tapered edge to snap fit with the external rearview mirror.

* * * * *